(12) United States Patent
Cadix

(10) Patent No.: US 11,312,894 B2
(45) Date of Patent: Apr. 26, 2022

(54) COMBINATION FOR FILTRATE CONTROL AND GAS MIGRATION

(71) Applicant: RHODIA OPERATIONS, Paris (FR)

(72) Inventor: Arnaud Cadix, Lille (FR)

(73) Assignee: RHODIA OPERATIONS, Aubervilliers (FR)

( * ) Notice: Subject to any disclaimer, the term of this patent is extended or adjusted under 35 U.S.C. 154(b) by 134 days.

(21) Appl. No.: 16/500,142

(22) PCT Filed: Mar. 30, 2018

(86) PCT No.: PCT/EP2018/058364
§ 371 (c)(1),
(2) Date: Oct. 2, 2019

(87) PCT Pub. No.: WO2018/185037
PCT Pub. Date: Oct. 11, 2018

(65) Prior Publication Data
US 2021/0095180 A1    Apr. 1, 2021

(30) Foreign Application Priority Data
Apr. 3, 2017  (FR) ..................................... 1752840

(51) Int. Cl.
| | | |
|---|---|---|
| *C09K 8/493* | (2006.01) | |
| *C04B 14/06* | (2006.01) | |
| *C04B 24/26* | (2006.01) | |
| *C04B 28/02* | (2006.01) | |
| *C09K 8/487* | (2006.01) | |
| *E21B 21/00* | (2006.01) | |
| *E21B 33/138* | (2006.01) | |
| *C04B 103/00* | (2006.01) | |

(52) U.S. Cl.
CPC .............. *C09K 8/493* (2013.01); *C04B 14/06* (2013.01); *C04B 24/2676* (2013.01); *C04B 24/2688* (2013.01); *C04B 28/02* (2013.01); *C09K 8/487* (2013.01); *E21B 21/003* (2013.01); *E21B 33/138* (2013.01); *C04B 2103/0061* (2013.01)

(58) Field of Classification Search
CPC ............ C04B 2103/0061; C04B 28/02; C04B 24/2688; C04B 24/2676; C04B 14/06; E21B 21/00; E21B 21/003; C09K 8/487; C09K 8/493
See application file for complete search history.

(56) References Cited

U.S. PATENT DOCUMENTS

| | | | |
|---|---|---|---|
| 2007/0111901 A1* | 5/2007 | Reddy ...................... | C09K 8/32 |
| | | | 507/221 |
| 2013/0203951 A1 | 8/2013 | Roland | |
| 2016/0214896 A1* | 7/2016 | Cadix ...................... | C09K 8/62 |

FOREIGN PATENT DOCUMENTS

| | | | | |
|---|---|---|---|---|
| EP | 0091377 A1 | 10/1983 | | |
| EP | 1369401 A2 * | 12/2003 | ............. | C04B 28/02 |
| EP | 1950266 A1 | 7/2008 | | |
| EP | 3115432 A1 | 1/2017 | | |
| FR | 2794464 A1 | 12/2000 | | |
| WO | 96/30421 A1 | 10/1996 | | |
| WO | 98/01478 A1 | 1/1998 | | |
| WO | 98/58974 A1 | 12/1998 | | |
| WO | 99/31144 A1 | 6/1999 | | |
| WO | 99/35177 A1 | 7/1999 | | |
| WO | 99/35178 A1 | 7/1999 | | |
| WO | 00/75207 A1 | 12/2000 | | |
| WO | 01/42312 A1 | 6/2001 | | |
| WO | 02/26836 A2 | 4/2002 | | |
| WO | 2012042167 A1 | 4/2012 | | |
| WO | WO-2013156551 A1 * | 10/2013 | ............. | C08J 3/075 |
| WO | 2015049378 A1 | 4/2015 | | |
| WO | 2016162388 A1 | 10/2016 | | |

* cited by examiner

*Primary Examiner* — Angela M DiTrani Leff
(74) *Attorney, Agent, or Firm* — Osha Bergman Watanabe & Burton LLP

(57) ABSTRACT

The present invention relates to the use of a combination of block polymers and particular compositions in a fluid injected under pressure into an oil-bearing rock, where: the fluid comprises solid particles and/or is brought into contact with solid particles within the oil-bearing rock following the injection thereof, the combination comprises (i) a polymer comprising: —a first block that is adsorbed on at least a portion of the particles; and —a second block, having a composition different from that of the first, and having a weight-average molecular weight of greater than 10 000 g/mol, for example greater than 100 000 g/mol, and that is soluble in the fluid; (ii) particles suitable for providing a gas barrier effect, preferably a latex and/or silica particles.

17 Claims, No Drawings

COMBINATION FOR FILTRATE CONTROL AND GAS MIGRATION

This application is a U.S. national phase entry under 35 U.S.C. § 371 of International Application No. PCT/EP2018/058364, filed Mar. 30, 2018, which claims priority to French Application No. 1752840, filed on Apr. 3, 2017. The entire contents of these applications are explicitly incorporated herein by this reference.

The present invention relates to the field of oil extraction. More specifically, it relates to agents providing an effect of controlling fluid loss and migration of liquids and gases in fluids injected under pressure into subterranean formations.

In the field of oil extraction, numerous stages are carried out by injecting fluids under pressure within subterranean formations. In the present description, the notion of "subterranean formation" is understood in its broadest sense and includes both a rock containing hydrocarbons, in particular oil, and the various rock layers traversed in order to access this oil-bearing rock and to ensure the extraction of the hydrocarbons. Within the meaning of the present description, the notion of "rock" is used to denote any type of constituent material of a solid subterranean formation, whether or not the material constituting it is strictly speaking a rock. Thus, in particular, the expression "oil-bearing rock" is employed here as synonym for "oil-bearing reservoir" and denotes any subterranean formation containing hydrocarbons, in particular oil, whatever the nature of the material containing these hydrocarbons (rock or sand, for example).

Mention may in particular be made, among the fluids injected under pressure into subterranean formations, of the various fluids for completion and workover of the wells, in particular drilling fluids, whether they are used to access the oil-bearing rock or else to drill the reservoir itself (drill-in), or else fracturing fluids, or alternatively completion fluids, control or workover fluids or annular fluids or packer fluids.

A specific case is that of oil cement grouts, which are employed for the cementing of the annulus of oil wells according to a method well-known per se, for example described in *Le Forage* [Drilling] by J. P Nguyen (Editions Technip 1993). These oil cement grouts are injected under pressure within a metal casing introduced into the drilling hole of the oil wells, then rise again, under the effect of the pressure, via the "annulus" space located between the casing and the drilling hole, and then set and harden in this annulus, thus ensuring the stability of the well during drilling.

Within an oil extraction well, bringing the fluid under pressure into contact with the subterranean formation (which generally exhibits a more or less high porosity, indeed even cracks) induces a "fluid loss" effect: the liquid present in the fluid has a tendency to penetrate into the constituent rock of the subterranean formation, which can damage the well, indeed even harm its integrity. When these fluids employed under pressure contain insoluble compounds (which is very often the case, in particular for oil cement grouts or else drilling or fracturing fluids comprising polymers), the effect of fluid loss at the same time brings about a concentration of the fluid, which can result in an increase in viscosity, which affects the mobility of the fluid.

In the specific case of a cement grout, the fluid loss can in addition result in excessively rapid setting of the cement, before the space of the annulus is cemented, which can, inter alia, weaken the structure of the well and harm its leaktightness.

For further details relating to the effect of fluid loss and its cementing effects, reference may in particular be made to *Well Cementing*, E. B. Nelson (Elsevier, 1990).

For the purpose of inhibiting the phenomenon of fluid loss, a number of additives have been described which make it possible to limit (indeed even in some cases completely prevent) the escape of the liquid present in the fluid toward the rock with which it comes into contact. These additives, known as "fluid loss control agents", generally make it possible to obtain, in parallel, an effect of control of the migration of gases, namely isolation of the fluid with respect to the gases present in the rock (gases which it is advisable to prevent from penetrating into the fluid, in particular in the case of cement grouts, these gases having a tendency to weaken the cement during setting).

Within the meaning of the present invention and unless explicitly indicated otherwise, "fluid loss" is understood to mean both a phenomenon of liquid migration and a phenomenon of gas migration.

Various fluid loss control agents of the abovementioned type have been provided, which include in particular cellulose derivatives (for example hydroxyethylcellulose) or alternatively AMPS-based copolymers, such as those described, for example, in U.S. Pat. No. 4,632,186 or 4,515,635. These additives are not always fully suitable for providing, in practice, effective limitation of fluid loss. In particular, and this is especially the case in the field of oil cement grouts, the presence of other additives can inhibit the effect of the agents employed for providing control of fluid loss. In particular, in the presence of some dispersing agents or set retarders, the abovementioned fluid loss control agents generally experience a deterioration in their properties.

An aim of the present invention is to provide novel fluid loss control agents for fluids injected under pressure into subterranean formations which are well-suited in practice.

To this end, the present invention proposes to use a specific combination including (i) specific copolymers, which are capable of providing a fluid loss control effect when they are employed with particles, with which they combine, (it being possible for these particles to be particles present within the subterranean formation; and/or cement particles in the case of a fluid employed in cementing; and/or particles injected within subterranean formations with the copolymers) and (ii) a specific composition inducing a gas-barrier effect, typically a latex or silica particles.

More specifically, according to a first aspect, a subject matter of the present invention is the use, as fluid loss and/or gas migration control agent in a fluid (F) injected under pressure into a subterranean formation,
where said fluid (F) comprises solid particles (p) and/or is brought into contact with solid particles (p) within the subterranean formation subsequent to its injection,
of a combination comprising:
(i) a block polymer (P) comprising:
   a first block (A) which is adsorbed on at least a portion of the particles (p); and
   a second block (B), with a composition distinct from that of said first block (A), with a weight-average molecular weight of greater than 10 000 g/mol, for example of greater than 100 000 g/mol, and which is soluble in the fluid (F),
(ii) particles capable of providing a gas-barrier effect, preferably a latex and/or silica particles.

According to one embodiment, the particles capable of providing a gas-barrier effect are latex.

The latex is typically in the form of a suspension containing from 35% to 60%, typically from 40% to 55%, for example from 40% to 50%, by weight, of dry latex.

The ratio of concentration of polymer (P) with respect to that of the dry latex is between 4% and 8% by weight.

In the combination of the polymer (P) with a latex of the invention which makes it possible to employ less latex in order to provide a gas-barrier effect, generally, the amount of dry latex is from 1.5% to 6% by weight, with respect to the amount of solid particles (p) containing in the fluid (F), typically oil cement grout. Preferably, the amount of dry latex is greater than 2%, typically greater than 2.2%, indeed even greater than 2.5%, and less than 5.5%, or for example less than 4.5%, indeed even less than 4%, by weight, with respect to the amount of solid particles (p) containing in the fluid (F), typically oil cement grout.

Generally, the amount of polymer (P) is from 0.1% to 0.5% by weight, with respect to the amount of solid particles (p) containing in the fluid (F), typically oil cement grout. Preferably, the amount of polymer is greater than 0.2% and less than 0.4% by weight, with respect to the amount of solid particles (p) containing in the fluid (F); for example, the amount of polymer (P) can be from 0.2% to 0.4% or from 0.25% to 0.4% by weight, with respect to the amount of solid particles (p) containing in the fluid (F).

The latex is typically made of styrene/butadiene having a styrene/butadiene ratio by weight of between 30:70 and 70:30, preferably between 40:60 and 60:40, suspended in an aqueous solution.

The aqueous solution can additionally comprise a stabilizer for the latex, for example a surfactant, such as is well known in this field. An example of the latex suspensions is described in EP 0 091 377.

When the polymer (P) is combined with a styrene/butadiene latex in an oil cement grout, it turns out that the combination provides both control of fluid loss and control of gas migration.

According to another embodiment, the particles capable of providing a gas-barrier effect are particles of silica, typically in the amorphous form.

The silica particles are typically dispersed or in the form of aggregates consisting of individual particles of 5 nm to 5 μm, preferably of 50 nm to 500 nm.

The silica particles can, for example, be in the form of a silica fume.

This is because, when the polymer (P) is combined with the silica particles in an oil cement grout, it turns out that the combination provides both control of fluid loss and control of gas migration.

Generally, the amount of silica is from 1.5% to 6% by weight, with respect to the amount of solid particles (p) containing in the fluid (F), typically oil cement grout. Generally, the amount of silica is greater than 2%, typically greater than 2.2%, indeed even greater than 2.5%, and less than 5.5%, for example less than 4.5%, indeed even less than 4%, by weight, with respect to the amount of solid particles (p) containing in the fluid (F), typically oil cement grout.

Generally, the amount of polymer (P) is from 0.1% to 0.5% by weight, with respect to the amount of solid particles (p) containing in the fluid (F), typically oil cement grout. More advantageously, the amount of polymer (P) is greater than 0.2% and less than 0.4% by weight, with respect to the amount of solid particles (p) containing in the fluid (F); for example, the amount of polymer (P) can be from 0.2% to 0.4% or from 0.25% to 0.4% by weight, with respect to the amount of solid particles (p) containing in the fluid (F).

Within the meaning of the present invention, typically, the first block (A), also known as "short block" hereinafter, has a weight-average molecular weight typically of less than 30 000 g/mol, which is adsorbed, preferably irreversibly, on at least a portion of the particles (p); and a second block (B), also known as "long block" hereinafter, has a composition distinct from that of said first block and a weight-average molecular weight of greater than 10 000 g/mol, for example of greater than 100 000 g/mol, and which is soluble in the fluid (F).

The specific polymer employed in the context of the present invention, due to the presence of the two specific blocks (A) and (B), turns out to provide a particularly efficient effect of control of the fluid: the presence of the block (A) provides anchoring of the polymer to the particles and the presence of the long block (B), which is large in size and soluble, schematically provides an effect of local increase in the viscosity of the fluid (F) around the particles.

There is thus obtained, at the surface of the particles (p), the formation of a polymer layer based on the long blocks (B) anchored to the particles using the blocks (A), the particles/polymers combination thus produced forming, as it were, a "plug" of sufficient size with respect to the porosities of the rock, which makes it possible to limit, indeed even to completely block, the phenomenon of fluid loss.

It should be noted that the use of polymers based on long blocks (B) alone would not provide control of fluid loss according to the invention, which requires anchoring of the long blocks (B) to the particles (p) via the short blocks (A), as is illustrated in the examples given at the end of the present description.

In particular, in order for this anchoring to be as effective as possible, it is preferable for the interaction between the short block (A) and the particles (p) to be as strong as possible and advantageously for this interaction to be irreversible. Preferably, the short block (A) of a polymer (P) of use according to the invention comprises:

at least one chemical group forming at least one bond of ionic, covalent or ionocovalent type between polymer and particle;

and/or several chemical groups each forming at least one hydrogen and/or Van der Waals bond between polymer and particle, the combination of these bonds together forming an overall bond with a force at least in the range of that of a bond of ionic, covalent or ionocovalent type.

In addition, the strong interactions between particles and polymers make it possible, if need be, to employ the polymer (P) in the presence of additives which are normally harmful to the effectiveness of the fluid loss control agents. In particular, the polymers (P) as employed according to the invention can be employed in the majority of the formulations of fluids intended to be injected into oil-bearing rocks, in particular oil cement grouts comprising additives of dispersant or set retarder type, as well as in drilling fluids and fracturing fluids.

According to a first alternative form of the invention, the injected fluid (F) comprises the polymer (P) but does not comprise solid particles (p), and it encounters said particles (p) within the subterranean formation subsequent to its injection. The association between particles and polymers then takes place in situ. Such a fluid can, for example, be injected during a drilling operation, and the rock cuttings formed during the drilling then perform the role of the particles (p) in situ.

According to a variant alternative form, the injected fluid (F) comprises, before the injection, at least a portion and generally all of the particles (p) combined with the polymer (P), it being understood that it can optionally encounter other particles (p) within the subterranean formation.

Two forms can in particular be envisaged in this context:

form 1: the polymer (P) and the particles (p) are mixed during the formulation of the fluid (F), on the site of operation or upstream, typically by adding the particles (p), in the dry state or optionally in the dispersed state, to a composition comprising the polymer (P) in solution. According to this alternative form, the fluid (F) can, for example, be an oil cement grout, which is prepared by adding cement powder as particles (p) to an aqueous composition comprising the polymer (P) in solution.

form 2: the fluid (F) is manufactured, advantageously on the site of operation, from a composition (premix) prepared upstream (hereinafter denoted by the term "blend") comprising the polymer (P) and at least a portion of the particles (p), generally within a dispersing liquid. In order to form the fluid (F), this blend is mixed with the other constituents of the fluid (F).

In the context of these forms 1 and 2, the polymer (P) incidentally exhibits the not insignificant advantage of improving the dispersibility and the suspending of the particles (p). In some embodiments, the polymers (P) combined with the particles (p) can be employed mainly as dispersing and stabilizing agent for the dispersion of the particles (p), at the same time providing an effect of agent for control of fluid loss.

According to another aspect, the subject matter of the present invention is certain specific block polymers which can be used according to the invention, which were developed by the inventors specifically for this application.

Another subject matter of the invention is the fluids for injection under pressure within an oil-bearing rock or a drilling well comprising these specific block polymers, and also the blends for the preparation of these fluids comprising these polymers in combination with particles (p).

Various specific advantages and embodiments of the invention will now be described in more detail.

The Fluid (F) and the Long Block (B)

The term "fluid" is understood to mean, within the meaning of the description, any homogeneous or non-homogeneous medium comprising a liquid or viscous vector which optionally transports a liquid or gelled dispersed phase and/or solid particles, said medium being overall pumpable by means of the devices for injection under pressure used in the application under consideration.

The term "liquid or viscous vector" of the fluid (F) is understood to mean the fluid itself, or else the solvent, in the case where the fluid comprises dissolved compounds, and/or the continuous phase, in the case where the fluid comprises dispersed elements (droplets of liquid or gelled dispersed phase, solid particles, and the like).

The nature of the fluid (F) and of the long block (B) of the polymers (P) used according to the present invention can vary to a fairly large extent, subject to the compatibility of the liquid or viscous vector of the fluid (F) and of the long block (B). In particular, use is made of a long block (B) of hydrophilic nature when the liquid or viscous vector present in the fluid (F) is of hydrophilic nature; conversely, when the liquid or viscous vector of the fluid (F) is hydrophobic, use is made of a long block (B) of hydrophobic nature.

The long block (B) of the polymers of use according to the invention is specifically soluble in the fluid (F). This is understood to mean that the long block (B), taken in isolation, can be dissolved in the liquid or viscous vector of the fluid (F). Preferably, the long block (B) is soluble at 25° C. and at 1% by weight in the liquid or viscous vector of the fluid (F). The notion of "solubility at 25° C." implies only that it is possible to obtain a more or less viscous, indeed even gelled, solution which, at 25° C., does not result in precipitation. This notion does not exclude the possibility of the dissolution of the block (B) involving prior heating to more than 25° C. in order to obtain this solution. In other words, the notion of "solubility at 25° C." implies the possibility of forming a solution which does not precipitate at 25° C. and not the possibility of forming, at 25° C., a solution which does not precipitate.

Furthermore, it is preferable for the long block (B) to develop the fewest possible interactions, indeed even no interactions at all, with the particles (p). Furthermore, it is preferable for the long block (B) of the polymers (P) of use according to the invention to develop fewer interactions with the particles than the short block (A).

In any case, the block (A) and the block (B) have distinct compositions. This is understood to mean that:
the blocks (A) and (B) comprise distinct monomer units; or
at least some of the monomers present on the block (A) are not present on the block (B); and/or at least some of the monomers present on the block (B) are not present on the block (A); or
the block (A) and the block (B) comprise the same monomer units but in distinct proportions.

According to a highly suitable embodiment, the fluid (F) is an aqueous fluid. The term "aqueous" is understood here to mean that the fluid comprises water as liquid or viscous vector, either as sole constituent of the liquid or viscous vector or in combination with other water-soluble solvents.

In the case of the presence of solvents other than water in the liquid or viscous vector of the fluid (F), the water advantageously remains the predominant solvent within the liquid or viscous vector, advantageously present in a proportion of at least 50% by weight, indeed even of at least 75% by weight, with respect to the total weight of the solvents in the liquid or viscous vector.

When the fluid (F) is an aqueous fluid, the block (B) is advantageously a block of hydrophilic nature. The term "block of hydrophilic nature" is understood here to mean a polymer block which, in the isolated state, is soluble in pure water in a proportion of 1% by weight at 25° C. (it being possible for the dissolution to optionally involve heating), forming a more or less viscous, indeed even gelled, solution but without formation of precipitate at 25° C.

Advantageously, the block (B) of hydrophilic nature employed when the fluid (F) is an aqueous fluid is at least predominantly composed of monomer units selected from the group consisting of the monomer units U1 to U5 defined below, and the mixtures of these monomer units:

monomer units U1: monomer units comprising an acrylamide, in particular dimethylacrylamide (DMA), or else (meth)acrylamide, morpholine N-oxide acrylamide or diacetone acrylamide functional group; the block (B) advantageously comprises monomer units of this type.

monomer units U2: monomer units comprising a sulfonic acid or sulfonate functional group, including in particular the 3-sulfopropyl (meth)acrylate, 2-propene-1-sulfonic acid, sodium 1-allyloxy-2 hydroxypropylsulfonate (COPS1), in particular 2-acrylamido-2-methylpropanesulfonic acid (AMPS), (meth)allyl sulfonate, sodium vinylsulfonate, sodium styrenesulfonate, (3-sulfopropyl)dimethyl(3-methacrylamidopropyl)ammonium, N-(2-methacryloyloxyethyl)-N,N-dimethyl-N-(3-sulfopropyl)ammonium betaine or N-(2-1-(3-sulfopropyl)-2-vinylpyridinium betaine units.

monomer units U3: neutral monomer units including, inter alia:
  esters of α,β-ethylenically unsaturated mono- or dicarboxylic acids with $C_2$-$C_{30}$ alkanediols or polyethylene glycols, for example 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, N-(hydroxymethyl)acrylamide, N-(2-hydroxypropyl)methacrylamide, N-hydroxyethylacrylamide, N-[tris(hydroxymethyl)methacrylamide, 4-acryloylmorpholine, 2-(N-morpholino)ethyl methacrylate, polyethylene glycol meth(acrylate), diethylene glycol (meth)acrylate, ethylene glycol methyl ether (meth)acrylate, 2-hydroxyethyl acrylate, hydroxypropyl acrylate, poly(propylene glycol) acrylate, 2-chloroethyl acrylate, tetrahydrofurfuryl acrylate, vinylacetamide, vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam or N-vinyl-7-ethyl-2-caprolactam.
monomer units U4: monomer units carrying ammonium groups, in particular esters of α,β-ethylenically unsaturated mono- or dicarboxylic acids with aminoalcohols, such as N,N-dimethylaminomethyl (meth)acrylate, N,N-dimethylaminoethyl (meth)acrylate, N,N-diethylaminoethyl acrylate, N,N-dimethylaminopropyl (meth)acrylate, N,N-diethylaminopropyl (meth)acrylate and N,N-dimethylaminocyclohexyl (meth)acrylate;
  amides of α,β-ethylenically unsaturated mono- or dicarboxylic acids with diamines having at least one primary or secondary amine group, such as N-[2-(dimethylamino)ethyl]acrylamide, N-[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide, N-[4-(dimethylamino)butyl]methacrylamide, N-[2-(diethylamino)ethyl]acrylamide, N-[4-(dimethylamino)cyclohexyl]acrylamide or N-[4-(dimethylamino)cyclohexyl]methacrylamide; N,N-diallylamines and N,N-diallyl-N-alkylamines, including in particular (3-sulfopropyl)dimethyl(3-methacrylamidopropyl) ammonium, N-(2-methacryloyloxyethyl)-N,N-dimethyl-N-(3-sulfopropyl)ammonium betaine, N-(2-1-(3-sulfopropyl)-2-vinylpyridinium betaine and N-(2-1-(3-sulfopropyl)-4-vinylpyridinium betaine.
monomer units U5: acrylate monomer units carrying a COOH or COO— group, including in particular acrylic acid, methacrylic acid, ethacrylic acid, α-chloroacrylic acid, crotonic acid, maleic acid, itaconic acid, citraconic acid, mesaconic acid, glutaconic acid, aconitic acid, fumaric acid or monoethylenically unsaturated $C_4$-$C_{10}$ and preferably $C_4$ to $C_6$ dicarboxylic acid monoesters, such as monomethyl maleate. According to one possible embodiment, the block (B) of hydrophilic nature employed when the fluid (F) is an aqueous fluid is composed essentially, indeed even exclusively, of monomer units of the abovementioned type, where, in the abovementioned units, the acid groups can be, in all or part, in the free acid form and/or in the salt form, for example potassium, sodium or ammonium salt form (neutralized form).

As employed in the present description, the expression "polymer or polymer block at least predominantly composed of monomer units 'x'" denotes a homopolymer or copolymer (block) resulting from the polymerization of a mixture of monomers, including monomers this homopolymer or copolymer (block) comprising less than 25 mol %, preferably less than 15 mol % and more advantageously still less than 10 mol % of monomer units other than the units 'x'.

The expression "polymer or polymer block essentially composed of monomer units 'x'" for its part denotes, within the meaning of the present description, a homopolymer or copolymer (block) at least predominantly composed of monomer units 'x' of the abovementioned type, more specifically comprising less than 5 mol %, preferably less than 2 mol % and more advantageously still less than 1 mol % of monomer units other than the units 'x'.

According to a specific embodiment compatible with the preceding embodiments, the block (B) of hydrophilic nature employed when the fluid (F) is an aqueous fluid can comprise hydrophobic monomers in small proportions, typically in a proportion of at least 0.05%, in particularly at least 0.1%, indeed even at least 0.5%, if appropriate; this content of hydrophobic monomers preferably remaining below 10%, for example below 5%, in particular below 3%, indeed even 2%, these percentages being expressed by weight with respect to the total weight of monomer units in the block (B). When hydrophobic monomers of this type are present, they can typically (but nonlimitingly) be chosen from alkyl acrylates (such as methyl acrylate), styrene, alkyl methacrylates and/or vinyl acetate.

The long block (B) present in the polymers employed according to the present invention furthermore has a weight sufficiently great to provide the desired effect of controlling fluid loss. To this end, the block (B) typically has a weight-average molecular weight of greater than 100 000 g/mol, preferably of greater than 150 000 g/mol, for example of greater than 200 000 g/mol, in particular of greater than 250 000 g/mol, this being the case in particular when the block (B) is of one of the abovementioned types. In practice, this weight-average molecular weight generally remains below 3 000 000 g/mol (and typically between 150 000 and 2 000 000 g/mol) but higher weights can be envisaged in the absolute, except in the specific case of a fluid (F) used in the context of a cementing operation, where it is preferable for the weight-average molecular weight of the long block (B) to remain below 1 000 000 g/mol and advantageously below 800 000 g/mol.

In the context of the present invention, it has furthermore been demonstrated that, surprisingly, the desired effect of controlling fluid loss is obtained for blocks (B) having a lower weight-average molecular weight than 100 000 g/mol. Thus, according to a specific embodiment, the block (B) has a weight-average molecular weight of between 10 000 and 100 000 g/mol, preferably of at least 20 000 g/mol, for example of at least 25 000 g/mol, it being possible for this weight-average molecular weight to be typically less than 90 000, for example less than 75 000, indeed even less than 50 000.

An estimation of the weight-average molecular weight of the long block (B) can be measured by size exclusion chromatography and measurement of weight using external calibration with polyethylene oxide standards (relative SEC), which results in a slightly increased value of the weight-average molecular weight denoted in the present description by Mw(relative SEC).

This Mw(relative SEC) is typically measured under the following conditions:

Mobile phase: Mixture of 80% by weight of deionized water, additivated with 0.1M NaNO$_3$, and 20% by weight of acetonitrile Flow rate: 1 ml/min Columns: Shodex OHpak SB 806 MHQ (3×30 cm columns)

Detection: Refractive index (Agilent concentration detector)

Concentration of the samples: approximately 0.5% by weight of solids in the mobile phase Injection: 100 µl Internal reference: ethylene glycol Calibration: polyethylene oxide PEO The Mw(relative SEC) of the long block (B) of the polymers (P) of use according to the invention is generally greater than or equal to 125 000 g/mol, preferably greater than or equal to 150 000 g/mol, this Mw(relative SEC) typically being between 200 000 and 2 500 000 g/mol, in particular between 250 000 and 2 000 000 g/mol. According to a more specific embodiment, it can be less than 125 000 g/mol, for example between 12 500 and 100 000 g/mol.

In the case of a fluid (F) used in the context of a cementing operation, the Mw(relative SEC) of the long block (B) of the polymers (P) is typically (but nonlimitingly) between 25 000 and 900 000 g/mol, for example between 250 000 and 900 000 g/mol.

In practice, the Mw(relative SEC) of the polymer (P) is measured, which, as a result of the low weight of the block (A), also represents a fairly good approximation, inflated, of the weight-average molecular weight of the block (B). The Mw(relative SEC) of the polymer (P) is generally greater than or equal to 15 000 g/mol, and for example greater than or equal to 150 000 g/mol, preferably greater than or equal to 200 000 g/mol, for example greater than or equal to 300 000 g/mol, in particular greater than or equal to 400 000 g/mol, this Mw(relative SEC) of the polymer (P) typically being between 200 000 g/mol and 2 500 000 g/mol, in particular between 250 000 g/mol and 2 000 000 g/mol. It is more particularly between 25 000 and 900 000 g/mol, for example between 250 000 g/mol and 800 000 g/mol, in the case of a fluid (F) used in the context of a cementing operation.

In the Specific Case where the Fluid (F) is Used in a Cementing Operation (Oil Cement Grout, Typically):

the block (B) is advantageously a block of hydrophilic nature, preferably comprising units U1 of the abovementioned type, in particular dimethylacrylamide DMA units, optionally but not necessarily in combination with units U2, in particular acrylamidomethylpropanesulfonic acid (AMPS) units, optionally in all or part in the sulfonate form, for example in the form of its sodium salt.

According to a specific embodiment, the block (B) is at least predominantly (for example essentially, indeed even exclusively) composed of a mixture of DMA and AMPS units, with a DMA/AMPS molar ratio for example of between 60/40 and 90/10, in particular between 75/25 and 85/15 and typically of the order of 80/20.

the block (B) typically has a weight-average molecular weight of between 150 000 and 750 000 g/mol, preferably between 200 000 and 700 000 g/mol. Alternatively, the block (B) can have a weight-average molecular weight of between 15 000 and 150 000 g/mol, preferably between 20 000 and 100 000 g/mol.

the block (B) typically has a Mw(relative GPC) of between 200 000 and 800 000 g/mol, preferably between 250 000 and 900 000 g/mol, for example from 300 000 to 600 000 g/mol, the polymer (P) generally having a Mw(relative SEC) within these ranges. The block (B) can alternatively have a Mw(relative GPC) of between 20 000 and 200 000 g/mol, preferably between 25 000 and 180 000 g/mol, for example 30 000 and 150 000 g/mol, the polymer (P) generally having a Mw(relative SEC) within these ranges.

The long block (B) employed when the fluid (F) is an oil cement grout is typically a random DMA/AMPS block with a DMA/AMPS molar ratio between 75/25 and 85/15 (typically of the order of 80/20) and a Mw(GPC-MALS) of between 20 000 and 7500 000, in particular between 200 000 and 750 0000, for example between 400 000 and 600 000.

The Particles (p) and the Short Block (A)

The notion of "particle" within the meaning under which it is employed in the present description is not confined to that of individual particles. It more generally denotes solid entities which can be dispersed within a fluid, in the form of objects (individual particles, aggregates, and the like) for which all the dimensions are less than 5 mm, preferably less than 2 mm, for example less than 1 mm.

The nature of the particles (p) and of the short block (A) of the polymers (P) used according to the present invention can vary to a fairly large extent, provided that the block (A) interacts with the particles (p) and results in an immobilization, preferably irreversible, of the polymer (P) on the surface of the particles (p).

To do this, the block (A) generally comprises monomer units carrying groups which develop, with the particles (p), stronger interactions than the long block (B).

According to a highly suitable embodiment, the particles (p) are inorganic particles introduced within the fluid (F) or with which the fluid (F) comes into contact subsequent to its injection. These particles (p) are then typically cement, calcium carbonate, clay, baryte, silica, sand or carbon black particles. According to this embodiment, the block (A) is preferably at least predominantly (and preferably essentially, indeed even exclusively) composed of monomer units chosen from the preferred groups defined hereinafter, to be adjusted on an individual basis as a function of the nature of the particles (p):

For Particles (p) of Calcium Carbonate or Cement:

the block (A) can in particular be at least predominantly (and preferably essentially, indeed even exclusively) composed of:

monomer units U5 of the abovementioned type, advantageously present in the block (A); and/or monomer units U3 of the abovementioned type; and/or monomer units U6 carrying phosphate, phosphonate or phosphinate groups (in the free acid form and/or in the saline form), such as, for example, monoacryloyloxyethyl phosphate or bis(2-methacryloyloxyethyl) phosphate units, the monomer units introduced by employing Sipomer PAM 100, 200, 400 or 5000 available from Solvay, vinylphosphonic acid, allylphosphonic acid, isopropylphosphonic acid, diallyl aminomethylene phosphonate and their salts.

The block (B) is then typically at least predominantly (and preferably essentially, indeed even exclusively) composed of units U1 and/or U2 of the abovementioned type.

For Particles (p) of Silica or Sand:
the block (A) can in particular be at least predominantly (and preferably essentially, indeed even exclusively) composed of:
monomer units U3 of the abovementioned type; and/or
monomer units U4 of the abovementioned type; and/or
monomer units U7 which are (meth)acrylate units functionalized by polydimethylsiloxanes, such as trimethylsiloxy-terminated PEG 4-5 methacrylate or 3-(trimethoxysilyl)propyl methacrylate.
The block (B) is then typically at least predominantly (and preferably essentially, indeed even exclusively) composed of units U1 and/or U2 and/or U5 of the abovementioned type.

For Particles (p) of Clay:
the block (A) can in particular be at least predominantly (and preferably essentially, indeed even exclusively) composed of:
monomer units U4 of the abovementioned type; and/or
monomer units U6 of the abovementioned type.
The block (B) is then typically at least predominantly (and preferably essentially, indeed even exclusively) composed of units U1 and/or U2 of the abovementioned type.

For Particles (p) of Carbon Black:
the block (A) can in particular be at least predominantly (and preferably essentially, indeed even exclusively) composed of hydrophobic units U8, including in particular:
esters of α,β-ethylenically unsaturated mono- or dicarboxylic acids with $C_1$-$C_{20}$ alcohols, such as, for example, methyl (meth)acrylate, methyl ethacrylate, ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate, n-hexyl (meth)acrylate, n-heptyl (meth)acrylate, n-octyl (meth)acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth)acrylate, arachidyl (meth)acrylate, behenyl (meth)acrylate, lignoceryl (meth)acrylate, cerotinyl (meth)acrylate, melissinyl (meth)acrylate, palmitoleoyl (meth)acrylate, oleyl (meth)acrylate, linoleyl (meth)acrylate, linolenyl (meth)acrylate, stearyl (meth)acrylate, lauryl (meth)acrylate, mono-, di- or tristyrylphenyl (meth)acrylates optionally ethoxylated between the aromatic and methacrylate groups; and/or
vinylaromatic monomer units, such as styrene, 2-methylstyrene, 4-methylstyrene, 2-(n-butyl)styrene, 4-(n-butyl)styrene or 4-(n-decyl)styrene;
fluorinated monomer units, such as perfluorinated or highly fluorinated alkyl (meth)acrylates.
The block (B) is then typically at least predominantly (and preferably essentially, indeed even exclusively) composed of units U1 and/or U2 and/or U5 of the abovementioned type.

Whatever its chemical nature, the short block (A) present in the polymers employed according to the present invention generally has a weight-average molecular weight between 500 and 30 000 g/mol, for example between 1000 and 25 000 g/mol, this being the case in particular when the block (A) is of one of the abovementioned types.

According to a particularly advantageous embodiment, employed when the particles (p) are particles of cement or calcium carbonate, the short block (A) is a poly(acrylic acid) homopolymer block with a weight-average molecular weight ranging from 1000 to 20 000 g/mol.

The weight-average molecular weight of the short block (A) can in particular be measured by gel permeation chromatography, followed by a multi-angle light scattering analysis (GPC-MALS).

The Polymers (P)

The polymers of use according to the present invention are specific polymers which comprise at least two blocks of very different size, including a large-sized block (B).

The polymers (P) are preferably prepared by controlled radical polymerization, which makes it possible to finely control the size of the two blocks.

The controlled radical polymerization technique is a technique well known per se which makes it possible, using a control agent for the polymerization, to obtain polymers of controlled weights and in particular block polymers, both the architecture and the size of each of the blocks of which can be controlled.

Controlled radical polymerization processes which are highly suitable for the synthesis of the polymers (P) of use according to the invention are the "RAFT" or "MADIX" processes, which typically employ a reversible addition-fragmentation transfer process employing control agents (also known as reversible transfer agents), for example of xanthate type (compounds carrying —SC=SO— functional groups). Mention may in particular be made, as examples of such processes, of those described in WO 96/30421, WO 98/01478, WO 99/35178, WO 98/58974, WO 00/75207, WO 01/42312, WO 99/35177, WO 99/31144, FR 2 794 464 or WO 02/26836.

These "controlled radical polymerization" processes result, in a well-known way, in the formation of polymer chains which grow substantially all at the same rate, which is reflected by a substantially linear increase in the molecular weights with the conversion and a narrow distribution in the weights, with a number of chains which remains typically substantially fixed throughout the duration of the reaction, which makes it possible to very easily control the mean molar mass of the polymer synthesized (the monomer/control agent initial ratio defines the degree of polymerization obtained for the chains synthesized). The chains obtained furthermore generally exhibit a "living" nature: they exhibit, at the chain end, the reactive group present on the control agent. For this reason, it is possible to continue the polymerization on the polymer chain obtained, while retaining the controlled nature of the polymerization, which can in particular be used to synthesize, at the end of a first polymer block of controlled size, another block with a different composition and also of controlled size.

In this context, the polymers (P) of use according to the invention can be polymers of the type which are prepared according to a process comprising the following stages:
(E1) the block (A)—or more rarely the block (B)—of the polymers (P) is synthesized by bringing into contact, in an aqueous medium:
the ethylenically unsaturated monomers, which are identical or different, chosen for the construction of the block (A)—respectively of the block (B);
a source of free radicals which is suitable for the polymerization of said monomers; and
a control agent for the radical polymerization, preferably comprising a thiocarbonylthio —S(C=S)— group;

(E2) the block (B)—respectively the block (A)—at the end of the block (A)—respectively at the end of the block (B)—formed in stage (1) is synthesized by bringing into contact:

the ethylenically unsaturated monomers, which are identical or different, chosen for the construction of the block (B)—respectively of the block (A);

a source of free radicals which is suitable for the polymerization of said monomers; and the polymer obtained on conclusion of stage (E1), which acts as control agent for the radical polymerization and onto which the block (B)—respectively the block (A)—is grafted.

In each of stages (E1) and (E2), the size of the polymer block being formed is controlled by the monomer/control agent molar ratio corresponding to the initial amount of monomers with respect to the amount of control agent: schematically, all the chains grow starting from each of the control agents present and the monomers are homogeneously distributed over all the growing chains. For this reason, the monomer/control agent molar ratio dictates the degree of polymerization of the block synthesized in each of the stages and thus makes it possible to define the theoretical number-average molecular weight expected for each of the blocks.

Typically, the monomer/control agent molar ratios in stages (E1) and (E2) are chosen so that:

The theoretical number-average molecular weight of the block (A) is between 250 and 25 000 g/mol, preferably between 500 and 15 000 g/mol, in particular between 1000 and 10 000 g/mol.

The theoretical number-average molecular weight of the block (B) is between 70 000 and 5 000 000 g/mol, preferably between 80 000 and 3 000 000 g/mol, in particular between 90 000 and 2 000 000 g/mol. When the polymer is intended for a cementing operation, this theoretical number-average molecular weight of the block (B) is more preferably between 90 000 and 1 000 000 g/mol, advantageously between 100 000 and 500 000 g/mol.

The block (B) can advantageously be prepared in stage (E2) by bringing into contact:

the ethylenically unsaturated monomers, which are identical or different, chosen for the construction of the block (B);

a source of free radicals which is suitable for the polymerization of said monomers; and the block (A) prepared according to the abovementioned stage (E1), which acts as control agent for the radical polymerization, preferably comprising a thiocarbonylthio —S(C=S)— group and onto which the block (B) is grafted;

with a concentration of monomers within the reaction medium of stage (E) which is sufficiently high to bring about the gelling of the medium if the polymerization were carried out in the absence of the control agent.

This polymerization technique makes it possible to access large-sized blocks (B). Advantageously, the synthesis of the block (B) can be carried out under the polymerization conditions described in the application WO 2012/042167.

Alternatively, when the block (B) is hydrophilic, the block (B) can be synthesized by bringing into contact, within an aqueous medium (M) in which the block (B) formed is not soluble:

the ethylenically unsaturated monomers, which are identical or different, chosen for the construction of the block (B) and chosen to be soluble in the aqueous medium (M);

at least one source of free radicals; and a reactive stabilizer which comprises:
  a polymer chain (PC) which is soluble in the medium (M),
  a group (G) providing the radical polymerization of stage (E) with a living and controlled nature, such as, for example, a group carrying a thiocarbonylthio —S(C=S)— group.

Generally, the conditions to be employed in the abovementioned polymerization stages can be those typically employed in controlled radical polymerizations.

In particular, use may be made, in stage (E) of the process of the invention, of any source of free radicals known per se. For example, one of the following initiators may be concerned:

hydrogen peroxides, such as: tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate or ammonium persulfate, azo compounds, such as: 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl]propionamide, 2,2'-azobis(N,N'-dimethyleneisobutyramidine) dichloride, 2,2'-azobis(2-amidinopropane) dichloride, 2,2'-azobis(N,N'-dimethyleneisobutyramide), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl]propionamide), 2,2'-azobis[2-methyl-N-(2-hydroxyethyl)propionamide] or 2,2'-azobis(isobutyramide) dihydrate, redox systems comprising combinations, such as:

mixtures of hydrogen peroxide, alkyl peroxide, peresters, percarbonates and the like and any of iron salts, titanous salts, zinc formaldehyde sulfoxylate or sodium formaldehyde sulfoxylate, and reducing sugars, alkali metal or ammonium persulfates, perborates or perchlorates in combination with an alkali metal bisulfite, such as sodium metabisulfite, and reducing sugars, and alkali metal persulfates in combination with an arylphosphinic acid, such as benzenephosphonic acid and the like, and reducing sugars.

In particular in the case of polymerizations carried out in an aqueous medium, use may be made of a radical initiator of redox type, which exhibits the advantage of not requiring heating of the reaction medium (no thermal initiation), which makes it possible to manage even better the exothermicity of the reaction.

Thus, the source of free radicals which is employed can typically be chosen from the redox initiators conventionally used in radical polymerization, typically not requiring heating for their thermal initiation. It is typically a mixture of at least one oxidizing agent with at least one reducing agent.

The oxidizing agent present in the redox system is preferably a water-soluble agent. This oxidizing agent can, for example, be chosen from peroxides, such as: hydrogen peroxide, tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, sodium persulfate, potassium persulfate, ammonium persulfate or also potassium bromate.

The reducing agent present in the redox system is also preferably a water-soluble agent. This reducing agent can typically be chosen from sodium formaldehyde sulfoxylate (in particular in its dihydrate form, known under the name Rongalit, or in the form of an anhydride), ascorbic acid, erythorbic acid, sulfites, bisulfites or metasulfites (in particular alkali metal sulfites, bisulfites or metasulfites), nitrilotrispropionamides, and tertiary amines and ethanolamines (which are preferably water-soluble).

Possible redox systems comprise combinations, such as:
mixtures of water-soluble persulfates with water-soluble tertiary amines,
mixtures of water-soluble bromates (for example, alkali metal bromates) with water-soluble sulfites (for example, alkali metal sulfites),
mixtures of hydrogen peroxide, alkyl peroxide, peresters, percarbonates and the like and any of iron salts, titanous salts, zinc formaldehyde sulfoxylate or sodium formaldehyde sulfoxylate, and reducing sugars,
alkali metal or ammonium persulfates, perborates or perchlorates in combination with an alkali metal bisulfite, such as sodium metabisulfite, and reducing sugars, and
alkali metal persulfates in combination with an arylphosphinic acid, such as benzenephosphonic acid and the like, and reducing sugars.

An advantageous redox system comprises (and preferably consists of), for example, the combination of ammonium persulfate and sodium formaldehyde sulfoxylate.

Generally, and in particular in the case of the use of a redox system of the ammonium persulfate/sodium formaldehyde sulfoxylate type, it proves to be preferable for the reaction medium of stage (E) to be devoid of copper. In the case of the presence of copper, it is generally desirable to add a copper-complexing agent, such as EDTA.

The nature of the control agent employed in the stages for the synthesis of the blocks (A) and (B) can, for its part, vary to a large extent.

According to an advantageous alternative form, the control agent used is a compound carrying a thiocarbonylthio —S(C=S)— group. According to a specific embodiment, the control agent can carry several thiocarbonylthio groups.

It can optionally be a polymer chain carrying such a group. Thus, the control agent employed in stage (E2) is a living polymer resulting from stage (E1). Likewise, the control agent of stage (E1) can be envisaged as resulting from a preliminary stage (E0) in which the radical polymerization was carried out of a composition comprising:
ethylenically unsaturated monomers;
a control agent for the radical polymerization comprising at least one thiocarbonylthio —S(C=S)— group; and
an initiator of the radical polymerization (source of free radicals).

More generally, a control agent suitable for the synthesis of the polymer (P) of use according to the invention advantageously corresponds to the formula (A) below:

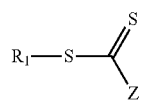

in which:
Z represents:
a hydrogen atom,
a chlorine atom,
an optionally substituted alkyl or optionally substituted aryl radical,
an optionally substituted heterocycle,
an optionally substituted alkylthio radical,
an optionally substituted arylthio radical,
an optionally substituted alkoxy radical,
an optionally substituted aryloxy radical,
an optionally substituted amino radical,
an optionally substituted hydrazine radical,
an optionally substituted alkoxycarbonyl radical,
an optionally substituted aryloxycarbonyl radical,
an optionally substituted acyloxy or carboxyl radical,
an optionally substituted aroyloxy radical,
an optionally substituted carbamoyl radical,
a cyano radical,
a dialkyl- or diarylphosphonato radical,
a dialkyl-phosphinato or diaryl-phosphinato radical, or
a polymer chain,
and
$R_1$ represents:
an optionally substituted alkyl, acyl, aryl, aralkyl, alkene or alkyne group,
a saturated or unsaturated, aromatic, optionally substituted carbocycle or heterocycle, or
a polymer chain.

The $R_1$ or Z groups, when they are substituted, can be substituted by optionally substituted phenyl groups, optionally substituted aromatic groups, saturated or unsaturated carbocycles, saturated or unsaturated heterocycles, or groups selected from the following: alkoxycarbonyl or aryloxycarbonyl (—COOR), carboxyl (—COOH), acyloxy (—$O_2$CR), carbamoyl (—$CONR_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—$NR_2$), halogen, perfluoroalkyl $C_nF_{2n+1}$, allyl, epoxy, alkoxy (—OR), S-alkyl, S-aryl, groups exhibiting a hydrophilic or ionic nature, such as alkali metal salts of carboxylic acids, alkali metal salts of sulfonic acid, polyalkylene oxide (PEO, PPO) chains, cationic substituents (quaternary ammonium salts), R representing an alkyl or aryl group, or a polymer chain.

According to a specific embodiment, $R_1$ is a substituted or unsubstituted, preferably substituted, alkyl group.

The optionally substituted alkyl, acyl, aryl, aralkyl or alkynyl groups generally exhibit from 1 to 20 carbon atoms, preferably from 1 to 12 and more preferably from 1 to 9 carbon atoms. They can be linear or branched. They can also be substituted by oxygen atoms, in particular in the form of esters, sulfur atoms or nitrogen atoms.

Mention may in particular be made, among the alkyl radicals, of the methyl, ethyl, propyl, butyl, pentyl, isopropyl, tert-butyl, pentyl, hexyl, octyl, decyl or dodecyl radical.

The alkyne groups are radicals generally of 2 to 10 carbon atoms; they exhibit at least one acetylenic unsaturation, such as the acetylenyl radical.

The acyl group is a radical generally exhibiting from 1 to 20 carbon atoms with a carbonyl group.

Mention may in particular be made, among the aryl radicals, of the phenyl radical, which is optionally substituted, in particular by a nitro or hydroxyl functional group.

Mention may in particular be made, among the aralkyl radicals, of the benzyl or phenethyl radical, which is optionally substituted, in particular by a nitro or hydroxyl functional group.

When $R_1$ or Z is a polymer chain, this polymer chain can result from a radical or ionic polymerization or from a polycondensation.

In the context of the present invention, it is in particular advantageous to employ, as control agents, xanthates, trithiocarbonates, dithiocarbamates or dithiocarbazates.

Use is advantageously made, as control agent, of compounds carrying a xanthate —S(C=S)O— functional group, for example carrying an O-ethyl xanthate functional group of formula —S(C=S)OCH$_2$CH$_3$, such as, for example, O-ethyl S-(1-(methoxycarbonyl)ethyl) xanthate of formula (CH$_3$CH(CO$_2$CH$_3$))S(C=S)OEt.

Another possible control agent in stage (E) is dibenzyl trithiocarbonate of formula PhCH$_2$S(C=S)SCH$_2$Ph (where Ph=phenyl).

The polymers (P) of use according to the invention generally comprise only the blocks (B) and (A). They are typically diblock polymers (A)-(B) but polymers comprising more blocks can be envisaged, in particular copolymers comprising a long block (B) onto which two or more short blocks are grafted (triblock polymers of (A)-(B)-(A) type in particular), or else copolymers comprising a spacer block between the block (B) and the block (A).

Some of the polymers of use according to the present invention are polymers which, to the knowledge of the inventors, have never been described previously.

These polymers comprise in particular the block polymers containing, preferably as sole blocks:
- at least one first block pAA at least predominantly (and preferably essentially, indeed even exclusively) composed of acrylic acid units, with a weight-average molecular weight between 500 and 30 000 g/mol, in particular between 1000 and 20 000; and
- a second block p(DMA/AMPS) at least predominantly (and preferably essentially, indeed even exclusively) composed of a random mixture of DMA and AMPS units, with a DMA/AMPS molar ratio of between 60/40 and 90/10 and with a weight-average molecular weight of greater than 150 000 g/mol, typically between 200 000 and 2 000 000 g/mol and in particular between 250 000 and 750 000 g/mol.

These polymers constitute a specific subject matter of the present invention, and also
  the oil cement grouts comprising them,
  the aqueous fluids for injection under pressure within an oil-bearing rock, in particular drilling fluids and fracturing fluids, comprising them in combination with inorganic particles, and also the blends for the preparation of these fluids.

Practical Applications

The polymers of use according to the invention can be employed in virtually all of the fluids used in oil extraction and potentially subject to fluid loss.

According to a specific embodiment of the invention, the fluid (F) is an oil cement grout which comprises the polymer (P) as additive. In this case, the polymer (P), combined with the particles present in the cement, provides the effect of control of fluid loss during the cementing.

According to another embodiment, the fluid (F) is a drilling fluid or a fracturing fluid which comprises the polymer (P) combined with particles (p). The particles (p) are then generally introduced jointly with the polymer into the fluid (F) before the injection of the fluid. The polymer then generally provides stabilization of the dispersion of the particles in the fluid (F) by keeping at least a portion of the particles (p) in suspension in the fluid.

The concentrations of polymer and particles to be employed in these various fluids can be adjusted individually as a function of the application targeted and of the rheology desired.

Various aspects and advantages of the invention will be further illustrated by the examples below, in which polymers were prepared according to the process of the invention.

EXAMPLE 1

Synthesis of poly(acrylic acid)-b-poly(N,N-di methylacrylamide-co-AMPS) Diblock Copolymers 1.1: Synthesis of Living Poly(Acrylic Acid) Blocks Having a Xanthate Ending (Short Blocks A1 to A4)

30 g of acrylic acid in an aqueous solvent (namely 70 g of distilled water for the blocks A1-A3—a mixture of 35 g of distilled water and 28 g of ethanol for the block A4) and O-ethyl S-(1-(methoxycarbonyl)ethyl) xanthate of formula (CH$_3$CH(CO$_2$CH$_3$))S(C=S)OEt (in the amounts shown in table 1 below, where the value of the theoretical number-average molecular weight expected ($M_n$, th), calculated by the ratio of the amount of monomer to the amount of xanthate, is also shown) and 312 mg of 2,2'-azobis(2-methylpropionamidine) dihydrochloride were introduced into a 250 ml round-bottomed flask at ambient temperature. The mixture was degassed by bubbling with nitrogen for 20 minutes.

The round-bottomed flask was subsequently placed in an oil bath thermostatically controlled at 60° C. and the reaction medium was left stirring at 60° C. for 4 hours.

On conclusion of these four hours, the conversion was determined by $^1$H NMR.

An analysis by size exclusion chromatography in a mixture of water and acetonitrile (80/20) additivated with NaNO$_3$ (0.1N) with an 18-angle MALS detector provides the weight-average molar mass ($M_w$) and polydispersity index ($M_w/M_n$) values given in table 1 below.

TABLE 1

| blocks A1-A4 | | | | | |
| --- | --- | --- | --- | --- | --- |
| Block synthesized | $M_n$, th (g/mol) | Xanthate (g) | Conversion ($^1$H NMR) | $M_w$ (g/mol) | $M_w/M_n$ |
| A1 | 10 000 | 0.624 | 99.5% | 22 000 | 1.8 |
| A2 | 5000 | 1.25 | 99.7% | 10 000 | 1.7 |
| A3 | 2500 | 2.50 | 99.6% | 5000 | 1.7 |
| A4 | 1000 | 6.24 | >99.9% | 2100 | 1.8 |

1.2: Synthesis of Diblock Copolymers from the Blocks A1 to A4 Polymers P1 to P17

The blocks A1 to A4 prepared as shown in section 1.1 were employed in their reaction medium obtained, without purification, with a weight of polymer $w_A$ given in table 2 below. The chosen block, in its reaction mixture without purification, was introduced into a 250 ml round-bottomed flask at ambient temperature and then N,N-dimethylacrylamide DMA, a 50% by weight aqueous AMPS solution (25% by molar ratio to the amount of N,N-dimethylacrylamide) and distilled water, with a final solids content of approximately 20% by weight, and ammonium persulfate as a 5.0% by weight aqueous solution were added (in amounts given in table 2 below).

The mixture was degassed by bubbling with nitrogen for 20 minutes. Sodium formaldehyde sulfoxylate, in the form of a 1.0% by weight aqueous solution, was added to the medium, the same weight of this solution being introduced as that of the ammonium persulfate solution (see table 2).

The polymerization reaction was allowed to take place without stirring at ambient temperature (20° C.) for 24 hours.

On conclusion of the 24 hours of reaction, the conversion was measured by $^1$H NMR (results in table 3).

An analysis by size exclusion chromatography in a mixture of water and acetonitrile (80/20 v/v) additivated with NaNO$_3$ (0.1N) with a refractive index detector provides the number-average molar mass ($M_n$) and polydispersity index ($M_w/M_n$) values which are listed in table 3.

TABLE 2 polymers P1 to P17: amounts of reactants employed during the synthesis

| Polymer synthesized | Short block $w_A$ (g) | $w_{DMA}$ (g) | $w_{AMPS}$ (g) | $w_{water}$ (g) | $w_{persulf}$ (g) | $w_{sfs}$ (g) |
|---|---|---|---|---|---|---|
| P1  | A1 | 0.835 | 15.3 | 17.7  | 75.6  | 6.0  | 6.0  |
| P2  | A1 | 1.65  | 15.2 | 17.6  | 75.7  | 6.0  | 6.0  |
| P3  | A1 | 1.65  | 6.16 | 7.12  | 29.1  | 3.0  | 3.0  |
| P4  | A1 | 2.68  | 5.06 | 5.85  | 25.4  | 3.0  | 3.0  |
| P5  | A1 | 3.99  | 5.60 | 6.47  | 27.9  | 3.0  | 3.0  |
| P6  | A1 | 5.51  | 5.19 | 6.00  | 27.3  | 3.0  | 3.0  |
| P7  | A2 | 0.426 | 15.2 | 17.6  | 75.6  | 6.0  | 6.0  |
| P8  | A2 | 0.847 | 15.2 | 17.6  | 75.6  | 6.1  | 6.3  |
| P9  | A2 | 0.840 | 6.28 | 7.27  | 29.6  | 3.0  | 3.0  |
| P10 | A2 | 1.59  | 5.93 | 6.86  | 29.6  | 3.0  | 3.0  |
| P11 | A2 | 2.13  | 5.98 | 6.91  | 29.0  | 3.0  | 3.0  |
| P12 | A2 | 3.05  | 5.67 | 6.55  | 28.8  | 3.0  | 3.0  |
| P13 | A3 | 0.703 | 25.6 | 29.6  | 138.1 | 3.0  | 3.0  |
| P14 | A3 | 1.74  | 25.3 | 29.3  | 137.6 | 3.0  | 3.0  |
| P15 | A4 | 0.177 | 31.7 | 36.6  | 157.5 | 12.0 | 12.0 |
| P16 | A4 | 0.287 | 25.6 | 29.6  | 139   | 3.0  | 3.0  |
| P17 | A4 | 0.709 | 25.3 | 29.3  | 138.7 | 3.0  | 3.0  |
| P18 | A4 | 5.33  | 25.3 | 29.3  | 138.7 | 0.5  | 0.5  |

$w_{water}$: weight of distilled water added, with the exclusion of the water added in the other solutions
$w_{persulf}$: weight of the 5% by weight aqueous ammonium persulfate solution added
$w_{sfs}$: weight of the 1% by weight aqueous sodium formaldehyde sulfoxylate solution

TABLE 3 polymers P1 to P17

| Polymer synthesized | Short block | Conversion DMA | AMPS | $M_w$ (kg/mol) | $M_w/M_n$ |
|---|---|---|---|---|---|
| P1  | A1 | 99.4%   | 98.0%   | 620 | 5.2 |
| P2  | A1 | 99.7%   | 99.2%   | 420 | 3.2 |
| P3  | A1 | >99.9%  | >99.9%  |     |     |
| P4  | A1 | >99.9%  | >99.9%  |     |     |
| P5  | A1 | >99.9%  | >99.9%  |     |     |
| P6  | A1 | >99.9%  | >99.9%  |     |     |
| P7  | A2 | 99.6%   | 99.8%   | 600 | 3.0 |
| P8  | A2 | 99.8%   | 99.2%   | 390 | 3.3 |
| P9  | A2 | >99.9%  | >99.9%  |     |     |
| P10 | A2 | >99.9%  | >99.9%  |     |     |
| P11 | A2 | >99.9%  | >99.9%  |     |     |
| P12 | A2 | >99.9%  | >99.9%  |     |     |
| P13 | A3 | 99.7%   | 98.7%   | 450 | 2.3 |
| P14 | A3 | >99.9%  | >99.9%  | 210 | 1.9 |
| P15 | A4 | 99.4%   | 99.6%   | 760 | 2.5 |
| P16 | A4 | 99.8%   | 99.5%   | 410 | 2   |
| P17 | A4 | 99.7%   | 99.4%   | 180 | 1.9 |
| P18 | A4 | >99%    | >99%    | 47.5| 1.5 |

EXAMPLE 2 (COMPARATIVE)

Synthesis of a poly(N,N-dimethylacrylamide-co-AMPS) Monoblock Polymer 15.3 g of N,N-dimethylacrylamide, 18 g of AMPS, 75.6 g of distilled water, 1.03 g of a 1% by weight ethanolic solution of O-ethyl S-(1-(methoxycarbonyl)ethyl) xanthate of formula (CH$_3$CH(CO$_2$CH$_3$))S(C=S)OEt and 6.0 g of a 5% by weight aqueous solution of ammonium persulfate were introduced into a 250 ml round-bottomed flask at ambient temperature. The mixture was degassed by bubbling with nitrogen for 20 minutes.

6.0 g of a 1% by weight aqueous solution of sodium formaldehyde sulfoxylate were subsequently added. The two aqueous solutions of ammonium persulfate and sodium formaldehyde sulfoxylate had been degassed beforehand by bubbling with nitrogen.

The polymerization reaction was then allowed to take place without stirring at ambient temperature (20° C.) for 24 hours.

On conclusion of the 24 hours of reaction, a conversion of 99.8% of N,N-dimethylacrylamide and of 99.6% of AMPS was obtained, as determined by $^1$H NMR.

An analysis by size exclusion chromatography in water additivated with NaNO$_3$ (0.1N) with a refractive index detector provides the following number-average molar mass ($M_n$) and polydispersity index ($M_w/M_n$) values (relative to the PEO standards):
$M_w$=1 070 000 g/mol
$M_w/M_n$=2.8.

EXAMPLE 3

Evaluation of Diblock Polymer in Combination with a Latex in Cement Grouts

The diblock polymer P13 prepared in example 1 and dried by evaporation on a plate is used in the powder form in combination with a styrene/butadiene latex to prepare oil cement grouts having the following formulations, in grams:

|  | 3-1 | 3-2 | 3-3 | 3-4 | 3-5 | 3-6 |
|---|---|---|---|---|---|---|
| Latex (g) | 103.9 | 86.6 | 69.24 | 0 | 0 | 69.2 |
| Diblock P13 (g) | 0 | 0 | 0 | 3.9 | 2.34 | 2.34 |
| Dispersant (polymelamine sulfonate) (g) | 1.95 | 1.17 | 1.56 | 0 | 1.56 | 1.17 |
| Retarder (calcium lignosulfonate) (g) | 0.39 | 0.39 | 0.39 | 0.78 | 0.78 | 0.39 |
| Organic antifoaming agent (g) | 1.38 | 1.38 | 1.38 | 1.38 | 1.38 | 1.38 |
| Municipal water (g) | 245 | 262 | 278.9 | 344.8 | 345.5 | 277.8 |
| Cement (g) | 780 | 780 | 780 | 780 | 780 | 780 |

The latex is added to the municipal water and to the liquid additives. The diblock and the solid additives are mixed with cement before incorporation in the liquid.

The formulation and the conditioning and the filtration test were carried out according to the standard of the American Petroleum Institute (API recommended practice for testing well cements, 10B, 2nd edition, April 2013).

After mixing and dispersing all the constituents of the formulation, the grout obtained was conditioned at 88° C. for 20 minutes in an atmospheric consistometer (model 1250 supplied by Chandler Engineering Inc.), prestabilized at this temperature, which makes it possible to simulate the conditions experienced by the cement grout during descent in a well.

The fluid loss control performance was determined by a static filtration at 88° C. in a double-ended cell with a capacity of 175 ml equipped with 325 mesh (45 µm) metal screens (supplied by Ofite Inc., reference 170-45). The gas migration control tests are carried out on a Model 120-57 gas migration tester supplied by Ofite. The principle of this appliance consists in allowing the cement grout to set under pressure during a prolonged filtration. If no gas diffuses through the cell, the grout is regarded as impermeable to gas migration.

The performance qualities of the polymers in the cement formulations are given in the table below:

| Formulation No. | 3-1 | 3-2 | 3-3 | 3-4 | 3-5 | 3-6 |
|---|---|---|---|---|---|---|
| Fluid loss V API (ml) | 85 | 400 | 381 | 80 | 121 | 39 |
| Gas migration control | yes | no | no | no | no | yes |

These results show that a combination of latex and of diblock polymer can advantageously be used to control both the fluid loss and the gas migration with a concentration of latex and a diblock which are greatly reduced with respect to the use of each of these additives used alone.

EXAMPLE 4

Evaluation of Diblock Polymer in Combination with Silica Particles in Cement Grouts The diblock polymer P13 prepared in example 1 and dried by evaporation on a plate is used in the powder form in combination with a silica fume (supplied by Condensil, grade 95ND) to prepare oil cement grouts having the following formulations, in grams:

|  | 4-1 | 4-2 | 4-3 |
|---|---|---|---|
| Silica fume (g) | 39 | 0 | 35.9 |
| Diblock P13 (g) | 0 | 3.12 | 3.12 |
| Dispersant (polymelamine sulfonate) (g) | 2.34 | 0.59 | 0.78 |
| Retarder (calcium lignosulfonate) (g) | 0.78 | 0.78 | 0.78 |
| Organic antifoaming agent (g) | 1.38 | 1.38 | 1.38 |
| Municipal water (g) |  | 345.1 | 350.2 |
| Cement (g) | 780 | 780 | 780 |

|  | 4-4 | 4-5 |
|---|---|---|
| Silica fume (g) | 22.1 | 27.63 |
| Diblock P13 (g) | 3.9 | 4.88 |
| Hydroxyethylcellulose suspending agent (g) | 0.325 | 0.325 |
| Retarder (calcium lignosulfonate) (g) | 3.25 | 5.85 |
| Organic antifoaming agent (g) | 1.4 | 1.4 |
| Municipal water (g) | 365.8 | 366.1 |
| Cement (g) | 650 | 650 |
| Silica flour (g) | 227.5 | 227.5 |

The silica fume is added to the municipal water and to the liquid additives and to the municipal water. The diblock and the solid additives are mixed with the cement before incorporation in the liquid.

The formulation and the conditioning and the filtration test were carried out according to the standard of the American Petroleum Institute (API recommended practice for testing well cements, 10B, 2nd edition, April 2013).

After mixing and dispersing all the constituents of the formulation, the grout obtained was conditioned at 88° C. for 20 minutes in an atmospheric consistometer (model 1250 supplied by Chandler Engineering Inc.), prestabilized at this temperature, which makes it possible to simulate the conditions experienced by the cement grout during descent in a well.

The fluid loss control performance was determined by a static filtration at 88° C. (for the formulations 4-1, 4-2 and 4-3), at 120° C. (for the formulation 4-4) and at 150° C. (for the formulation 4-5) in a double-ended cell with a capacity of 175 ml equipped with 325 mesh (45 µm) metal screens (supplied by Ofite Inc., reference 170-45). The gas migration control tests are carried out on a Model 120-57 gas migration tester supplied by Ofite. The principle of this appliance consists in allowing the cement grout to set under pressure during a prolonged filtration. If no gas diffuses through the cell, the grout is regarded as impermeable to gas migration.

The performance qualities of the polymers in the cement formulations are given in the table below:

| Formulation No. | 4-1 | 4-2 | 4-3 | 4-4 | 4-5 |
|---|---|---|---|---|---|
| Temperature (° C.) | 88 | 88 | 88 | 120 | 150 |
| Fluid loss V API | 400 | 80 | 46 | 15 | 14 |
| Gas migration control | no | no | yes | yes | yes |

These results show that a combination of latex and of diblock polymer can advantageously be used to control both the fluid loss and the migration in combination with a dispersion of silica fume.

The invention claimed is:

1. A method, comprising injecting a fluid (F) under pressure into a subterranean formation,
   wherein said fluid (F) comprises solid particles (p) or is brought into contact with solid particles (p) within the subterranean formation subsequent to its injection, and a combination comprising:
   (i) a block polymer (P) comprising:
      a first block (A) which is adsorbed on at least a portion of the solid particles (p); and
      a second block (B) with a composition distinct from that of said first block (A), with a weight-average molecular weight of greater than 10,000 g/mol and less than 1,000,000 g/mol and which is soluble in fluid (F), and
   (ii) particles capable of providing a gas barrier effect;
      wherein the amount of the particles capable of providing the gas barrier effect is between 1.5 to 6% by weight and the amount of the block polymer (P) is from 0.1% to 0.5% by weight, with respect to the solid particles (p) in the fluid.

2. The method according to claim 1, wherein the particles capable of providing a gas barrier effect (ii) are a latex.

3. The method according to claim 2, wherein the latex is in the form of a suspension containing from 40% to 50% by weight of dry latex.

4. The method according to claim 3, wherein the concentration of the block polymer (P) with respect to that of the dry latex is between 4% and 8% by weight.

5. The method according to claim 1, wherein the latex is made of styrene/butadiene.

6. The method according to claim 5, wherein the styrene/butadiene ratio by weight is between 30:70 and 70:30.

7. The method according to claim 6, wherein the styrene/butadiene ratio by weight is between 40:60 and 60:40.

8. The method according to claim 1, wherein the particles capable of providing a gas barrier effect (ii) are silica particles.

9. The method according to claim 8, wherein the silica particles are in the amorphous form.

10. The method according to claim 8, wherein the silica particles are dispersed or in the form of aggregates consisting of individual particles of 5 nm to 5 μm.

11. The method according to claim 1, wherein the fluid (F) is an aqueous fluid and wherein the block (B) is a block at least predominantly composed of monomer units selected from the group consisting of the monomer units U1 to U5 defined below, and the mixtures of these monomer units:

monomer units U1: monomer units comprising an acrylamide functional group, monomer units U2: monomer units comprising a sulfonic acid or sulfonate functional group, monomer units U3: neutral monomer units, esters of α,β-ethylenically unsaturated mono- or dicarboxylic acids with $C_2$-$C_{30}$ alkanediols or polyethylene glycols, and tetrahydrofurfuryl acrylate, vinylacetamide, vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam or N-vinyl-7-ethyl-2-caprolactam, monomer units U4: monomer units carrying ammonium groups, including amides of α,β-ethylenically unsaturated mono- or dicarboxylic acids with diamines having at least one primary or secondary amine group; N,N-diallylamines or N,N-diallyl-N-alkylamines, monomer units U5: acrylate monomer units carrying a COOH or COO— group, wherein the block (B) optionally comprises hydrophobic monomers in a proportion of 0.05% to 10% by weight, with respect to the total weight of monomer units in the block (B).

12. The method according to claim 11, wherein the block (B) optionally comprises hydrophobic monomers in a proportion of 0.05% to 10% by weight, with respect to the total weight of monomer units in the block (B).

13. The method according to claim 1, wherein the fluid (F) is an oil cement grout which comprises the block polymer (P) as an additive.

14. The method according to claim 13, wherein:

the block (B) comprises monomer units U1 comprising an acrylamide functional group, and optionally units U2 comprising a sulfonic acid or sulfonate functional group; and the block (B) has a weight-average molecular weight of between 150 000 and 750 000 g/mol.

15. The method according to claim 14, wherein the block (B) comprises dimethylacrylamide (DMA) units, and optionally units U2 comprising acrylamidomethylpropanesulfonic acid (AMPS), and/or has a weight-average molecular weight of between 200 000 and 700 000 g/mol.

16. The method according to claim 1, wherein the second block (B) has a weight-average molecular weight of between 10 000 and 750 000 g/mol.

17. The method according to claim 1, wherein the particles capable of providing a gas barrier effect are a latex and/or silica particles.

* * * * *